A. G. THOMSON.
VEHICLE LAMP ATTACHMENT.
APPLICATION FILED DEC. 8, 1908.

936,831.

Patented Oct. 12, 1909.

WITNESSES;
Reni S. Berry
F. E. Maynard.

INVENTOR
ARTHUR GALE THOMSON
BY Geo. H. Strong.
HIS ATTORNEY.

UNITED STATES PATENT OFFICE.

ARTHUR GALE THOMSON, OF SAN FRANCISCO, CALIFORNIA.

VEHICLE-LAMP ATTACHMENT.

936,831.

Specification of Letters Patent. Patented Oct. 12, 1909.

Application filed December 8, 1908. Serial No. 466,448.

*To all whom it may concern:*

Be it known that I, ARTHUR GALE THOMSON, citizen of the United States, residing in the city and county of San Francisco and State of California, have invented new and useful Improvements in Vehicle-Lamp Attachments, of which the following is a specification.

My invention relates to a connection or attachment for automobile lamps whereby the lamp or lamps will be turned in unison with the front steering wheels so that the rays of the lamp or lamps will be cast along the road in the actual direction of travel.

Automobile lamps are generally mounted rigidly on the machine frame and always cast their rays in a line substantially parallel with the vehicle body. The result is that in traveling over a crooked road, or in turning from side to side in traveling along the road, obstructions and embankments are frequently not seen until it is too late for the driver to correct or check his course and so prevent an accident.

My object is to so mount a lamp that it will turn from side to side synchronously with the movements of the steering wheels, so that a driver can always see exactly what is ahead of him in the immediate direction of travel.

The invention consists of the parts and the construction and combination of parts as hereinafter more fully described and claimed, having reference to the accompanying drawings, in which—

Figure 1:
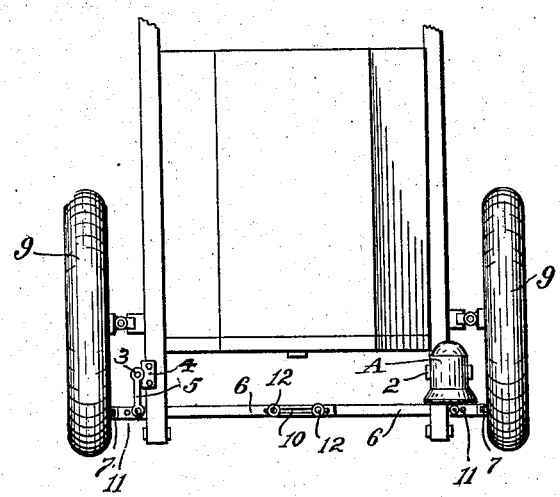
Figure 2:
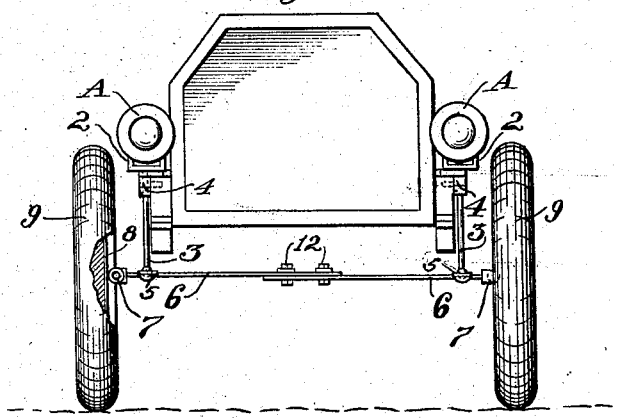

Figure 1 is a plan view. Fig. 2 is a front elevation.

In the embodiment of my invention the lamps, which are represented at A, are adapted to be carried on the lamp brackets 2 which are carried on the posts 3. Each post 3 is arranged to turn in suitable bearings provided by the brackets 4, which latter are secured in any suitable manner to the body of the machine. Where two lamps are used, as is customary, the posts or studs 3 are suitably connected, as by the arms 5 and adjustable links 6, so that the two lamps will swing in unison. The links 6 extend between the front steering wheels 9 of the vehicle and carry rollers 7 at their outer ends adapted to bear constantly on the ring plates 8 fixed on the inner side of the wheels 9; these links being slotted, as shown at 10, and perforated, as shown at 11, by which the links and lamps may readily be adjusted to any machine, the links being securely locked together as one piece, by suitable means, as the nuts and bolts 12. The links have a pivotal connection through one or other of the holes 11 with the lamps, and the rollers 7 are spaced apart a distance just equal to the distance between the bearing rings 8, so that no matter which way the wheels 9 turn, they will always cause the lamps to turn too; so that the rays of light of the lamps will be cast forward always between the planes of the two wheels.

Having thus described my invention, what I claim and desire to secure by Letters Patent is—

1. In an automobile, the combination with the body and the steering wheels thereof, of a lamp pivotally mounted on the body, and means extending between the wheels and engaged directly thereby to turn the lamp in unison with the wheels.

2. The combination in an automobile, with the body and steering wheels thereof, of a lamp mounted to swing from side to side, a bar extending between the wheels and engageable by the wheels to reciprocate the bar, and connections between the bar and the lamp to turn the latter in unison with the wheels.

3. In an automobile, the combination with the body and steering wheels thereof, of a lamp mounted to swing from side to side, an extendible bar arranged between the wheels and having rollers at its ends, each roller engaged by a wheel and said bar reciprocated by the wheels, and connections between the lamp and said bar to turn the lamp in unison with the wheels.

In testimony whereof I have hereunto set my hand in presence of two subscribing witnesses.

ARTHUR GALE THOMSON.

Witnesses:
 CHARLES A. PENFIELD,
 CHARLES EDELMAN.